United States Patent [19]

Fisli

[11] 4,101,365
[45] Jul. 18, 1978

[54] PROCESS OF MAKING HIGH SPEED MULTIFACETED POLYGONAL SCANNERS

[75] Inventor: Tibor Fisli, Los Altos Hills, Calif.

[73] Assignee: Xerox Corporation, Stamford, Conn.

[21] Appl. No.: 687,963

[22] Filed: May 19, 1976

[51] Int. Cl.$^2$ .......................... B29C 27/16; G02B 5/08
[52] U.S. Cl. ..................... 156/294; 156/303.1; 156/293; 264/129; 264/275; 350/288; 350/6.8; 427/162; 427/248 J; 427/250
[58] Field of Search ................. 427/248 J, 250, 164, 427/166, 167, 163, 162; 428/66; 350/7, 320, 288; 264/275, 129; 156/294, 293, 303.1

[56] References Cited

U.S. PATENT DOCUMENTS

| | | | |
|---|---|---|---|
| 2,456,241 | 12/1948 | Axler et al. | 427/166 |
| 3,087,201 | 4/1963 | Williams et al. | 264/275 X |
| 3,247,301 | 4/1966 | Praeg et al. | 264/225 |
| 3,298,894 | 1/1967 | Barnette | 264/275 X |
| 3,450,465 | 6/1969 | Prance et al. | 350/288 X |
| 3,607,457 | 9/1971 | Hagg et al. | 427/162 X |
| 3,673,040 | 6/1972 | Hill | 156/294 |
| 3,687,713 | 8/1972 | Adams | 350/288 UX |
| 3,770,477 | 11/1973 | Weichselbaum | 427/2 X |
| 3,848,087 | 11/1974 | Correll | 350/7 X |

FOREIGN PATENT DOCUMENTS

1,335,065  10/1973  United Kingdom ................ 427/162

OTHER PUBLICATIONS

Powell et al., Vapor Deposition, p. 556 (1966).

*Primary Examiner*—Harry J. Gwinnell
*Attorney, Agent, or Firm*—Sheldon F. Raizes; Terry J. Anderson; Irving Keschner

[57] ABSTRACT

A high speed multi-faceted polygonal scanner is provided by injection molding. An adhesion promoting coating is applied to the injection molded acrylic polygon in order to accept subsequently applied thin reflective coating of for example aluminum which provides the finished faces of the multi-faceted scanner. Methods of employing these scanning systems in flying spot applications are also disclosed.

8 Claims, 3 Drawing Figures

PROCESS OF MAKING HIGH SPEED MULTIFACETED POLYGONAL SCANNERS

BACKGROUND OF THE INVENTION

Multi-faceted scanners usually comprising multi-faceted rotating mirrors are employed in well known techniques for erecting optical scanning between a light source and a photocell. Typically, a light illuminates a silvered mirror, for example, at an angle of 45° to direct light toward a facet that is reflected from the facet toward the object being scanned. Normally the object reflects this light back along the same path upon a photocell. The duration of the scan corresponds to the time for a facet to pass the light beam along the object being scanned. It is usually preferred that the object path scanned is independent of which facet is then in the light beam path.

In connection with television equipment, it is known to use mirror prisms for image scanning along one dimension, usually for line scanning. Since the advent of television, cameras operating in accordance with the image storage system, the need for such mirror prisms has become greatly increased. Recently television cameras have been designed for operation within the infrared radiation range, for example, within the range of 2 to 5.5 microns. Television cameras operating within this wave-length require mirrors or similar light deflecting optical means for scanning an image. Usually one means, for instance, a light deflecting mirror, is used for vertical scanning image division. Rotary mirror prisms which are generally prisms composed of several plane mirrors such as glass mirrors are conventionally employed by suitably mounting them on a shaft or other rotary support. These mechanically composed rotary prisms are found to have many disadvantages, both as to their optical characteristics and their mechanical reliability. In particular, they have been found mechanically difficult to mount the several planed mirrors so that they accurately form a polygonal shape of predetermined dimensions. For short optical path lengths, slight misalignment of the facets is found to be of little practical significance. However, when the distance between the scanning mirror and the object being scanned is many feet, slight misalignment of the facets results in the path of scan changing from one facet to the other. Such a result is especially disadvantageous when scanning labels with an encoded stripe arrangement. If there is misalignment of the facets one facet might make a perfect scan of the coded stripes while the next facet would register no scan at all or only scan a few of the stripes.

Morever, it is difficult to mount the mirrors so that they accurately retain their spatial positions when subjected to the stresses of high speed rotation. The last mentioned mounting problem entails a danger of injury to persons close to the spinning mirror prism which is often unavoidable. Obviously when the mirror prism should disintegrate shrapnel is produced which may cause serious injury to a bystander.

Thus, many methods have been investigated to produce multi-faceted scanners so that the materials from which they are composed would have high modulus to density ratio, low thermal expansion, low Poisson's ratio, good workability and possess the ability to be readily polishable or coatable with a substance which in turn can be polished to produce high quality optical surfaces. Unfortunately, the imposition of these material restrictions result in the requirement of a material which is not readily available. Presently, in view of these material restrictions and limitations, scanners are now being manufactured from glass, stainless steel, beryllium and chromium carbide. The latter two materials are the most widely used since they more nearly meet the requirements of the predicated material limitations. Of these two, beryllium is found to best satisfy the material requirements of the predicated material limitations and consequently is found to perform in a superior fashion when employed. However, the use of beryllium to provide multi-faceted scanners in and of itself results in still other problems among which are exorbitant cost of the material and the extreme difficulty of working the material into the desired configurations. Chromium carbide scanners, although not as expensive as beryllium scanners, possess very high density and therefore require in the overall general construction of the scanner a driver motor and bearings which are much heavier and much more costly to provide.

There is therefore a demonstrated need to provide multi-faceted scanner systems which may be precisely machined, inexpensively, and with great facility than known scanner systems enabling these multi-faceted scanners to be considered for employment in a vast number of applications other than military or development laboratories where the exorbitant costs of currently available scanner systems can only be justified.

It is therefore an object of this invention to provide a novel multi-faceted scanning system devoid of the above noted deficiencies.

It is another object of this invention to provide a novel multi-faceted scanner capable of operation at high rotational speeds.

It is another object of this invention to provide a novel multi-faceted scanner system characterized by precise alignment of the facets.

Another object of this invention is to provide a novel scanning system which achieves precise alignment of the different facets with techniques that are relatively easy to perform.

These and other objects of the system of the instant invention are accomplished, generally speaking, by providing acrylic high speed multi-faceted scanners by injection molding. Injection molded acrylic has been used for the production of lowcost, medium quality lenses. However, it has not been practical to employ acrylics in reflecting optics due to its low adhesion to thin film coatings such as aluminum. Since the advent of the application of magnesium fluoride as an overcoating to acrylic substrates, it has now been made possible to properly adhere surfaces which possess the proper reflecting optics or reflectivity to the acrylic substrates employing techniques more fully described in copending application Ser. No. 687,962, filed May 19, 1976.

Two methods, for example, that may be employed in providing injection molded high speed multifaceted scanners include: providing an aluminum hub which is placed into a die cavity having the proper facet geometry. The aluminum hub is sized so as to provide a suitably dimensioned injection ring having suitable mechanical properties and optical properties for high speed scanning applications. Acrylic is injection molded into the gap between the aluminum hub and the die cavity. In order that the resulting member represent a stressfree ring at room temperature, the aluminum disks have to be preheated to approximately 500° F, for example, or roughly 100° F above molding temperature to accommodate the slightly high acrylic shrink rate. The effect of the preheat will be minimal on the physical properties of the aluminum alloy employed of which aluminum 7075-T651 is preferred. The configuration of the scanner showing the adaption of molded acrylic to the aluminum disk workpiece is seen in FIG. 1 which will be specifically discussed later. A variation of this first method which is less complicated and expensive eliminates the aluminum resulting in a solid acrylic injection molded scanner.

In another embodiment the acrylic ring is molded separately and then cemented onto an aluminum hub fabricated of the aluminum alloy recited above. In FIG. 2 which is later discussed, the specifics of this method and configuration are more specifically outlined.

In both cases the acrylic is coated with magnesium fluoride and then a mirror-like finish of aluminum is applied with a protective coating of, usually, silicon monoxide to complete the process if desired. The 7075 aluminum disk above is found to be rotational at actual speeds of about 123,000 rpm although higher rates are obtainable. The strength and other characteristics of the acrylic disk is quite different from the aluminum disk. The maximum rpm that the aluminum acrylic polygon can be rotated is somewhat lower than about 40,000 rpm for scanners produced by the first method and somewhat higher than about 40,000 rpm for scanners produced by the second method. This difference is due to the fact that in the first method a fraction of the strength of the acrylic is used to hold the ring on the disk while in the second method the strength of the ring is enhanced by the cement used to secure the acrylic in place. The above values have been derived from equation which follows:

$$S_{(t)} = \frac{\gamma \omega^2}{4G} [(3 + \mu)b^2 + (1 - \mu)a]$$

where $S_{(t)}$ = maximum tangential stress (PSI) at the bore
$\gamma$ = weight per inch$^3$ (0.05)
$G$ = gravitational constant
$\omega$ = radians per second It should be noted however that for medium and low speed scanning applications the scanner may be fabricated of injected molded acrylic eliminating the need for an aluminum alloy preform.

7075-T651 aluminum alloy is recommended when extra strength and hardness are required. It is used primarily for aircraft and ordinance applications. The preferred aluminum alloy for use in this system is found to have the following properties:

| Nominal Chemical Composition | | |
|---|---|---|
| Zinc | 5.6% | |
| Magnesium | 2.5% | |
| Copper | 1.6% | |
| Chromium | 0.3% | |
| Aluminum | Balance (incl. normal impurities) | |
| Typical Mechanical Properties | Tensile Strength, psi | 83,000 |
| | Yield Strength, psi | 73,000 |
| | Elongation, % in 2" | 11 |
| | Shear Strength, psi | 48,000 |
| | Brinell Hardness 10/500 | 150 |
| Typical Physical Properties | Density, Lbs./Cu. In. | 0.101 |
| | Melting Range, approx. °F | 890–1180 |
| | Electrical Conductivity, % IACS at 20° C (68° F) | 33 |
| | Thermal Conductivity, btu at 25° C (77° F) | 900 |
| | Average Coefficient of Thermal | |

| Nominal Chemical Composition | |
|---|---|
| Expansion at 68° to 212° F | 0.0000131 |

These typical properties are average values.

| Fabricating Performance | |
|---|---|
| Cold Forming: | Poor |
| Machining: | Good |
| Brazing: | Not suitable |
| Welding: | |
| Arc, | Poor |
| Gas, | Poor |
| Resistance, | Good |

| Government & Industry Specifications | | |
|---|---|---|
| | Cold Finish-Rolled | Extruded |
| A.M.S. | 4122C, 4123A | 4154F, 4168A, 4169B |
| A.S.T.M. | B211 | B221 |
| Federal | QQ-A-225-9b(QQ-A-282) | QQ-A-200/11b(QQ-A-277) |
| Military | None | None |
| S.A.E. | AA7075 | AA7075 |

The general premise of the system of the instant invention having been discussed, the specifics of the instant invention will be more clearly understood with regard to the drawings of which:

Figure 1:
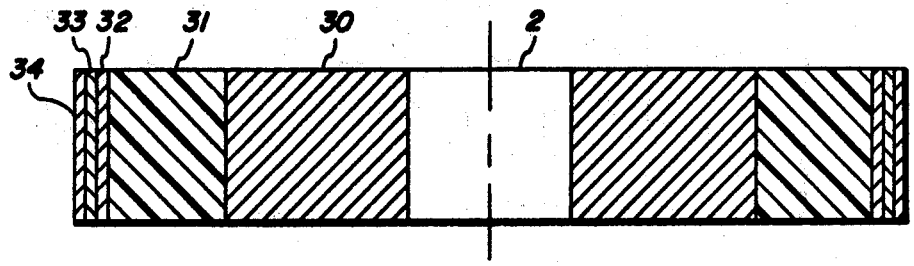
FIG. 1 illustrates an acrylic ring having the proper facet geometry on its perimeter which is molded directly onto an aluminum disk.

In FIG. 1 an aluminum alloy 7075-T651 precisely machined aluminum disk 30 has molded to its periphery an acrylic ring 31 having the proper facet geometry on its perimeter. The acrylic ring 31 is molded on employing conventional injection molding techniques which include: forcing preheated acrylic in a molten state into a die cavity having the required geometry. The proper facet geometry of the acrylic ring is accomplished by providing precision surfaces in the die cavity. The aluminum disk preform 30 is machined to a geometry of a circular disk with a mounting bore on its axis 2.

Figure 2:
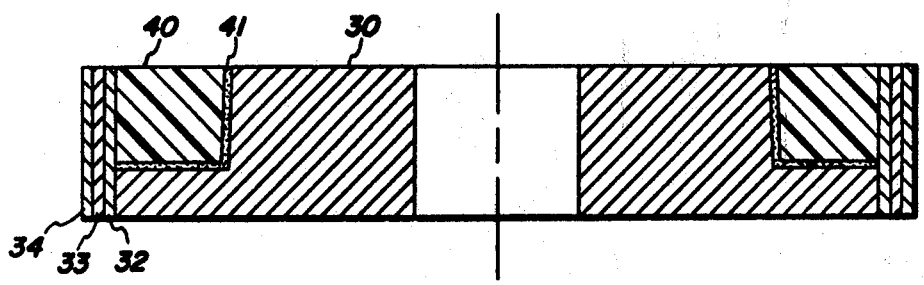
FIG. 2 is illustrated the embodiment wherein the acrylic ring is molded separately and then cemented onto the aluminum preform disk.

In FIG. 2 is seen an acrylic ring 40 molded separately and then cemented onto the preformed aluminum alloy disk 30 recited above employing cement 41. A one and one-half to two degree draft angle exists between the molded on acrylic ring 40 and the aluminum preform 30. Again, the aluminum preform 30 possesses a geometry of a disk having part of the perimeter removed by a turning lathe in order to provide space for the acrylic ring.

Figure 3:
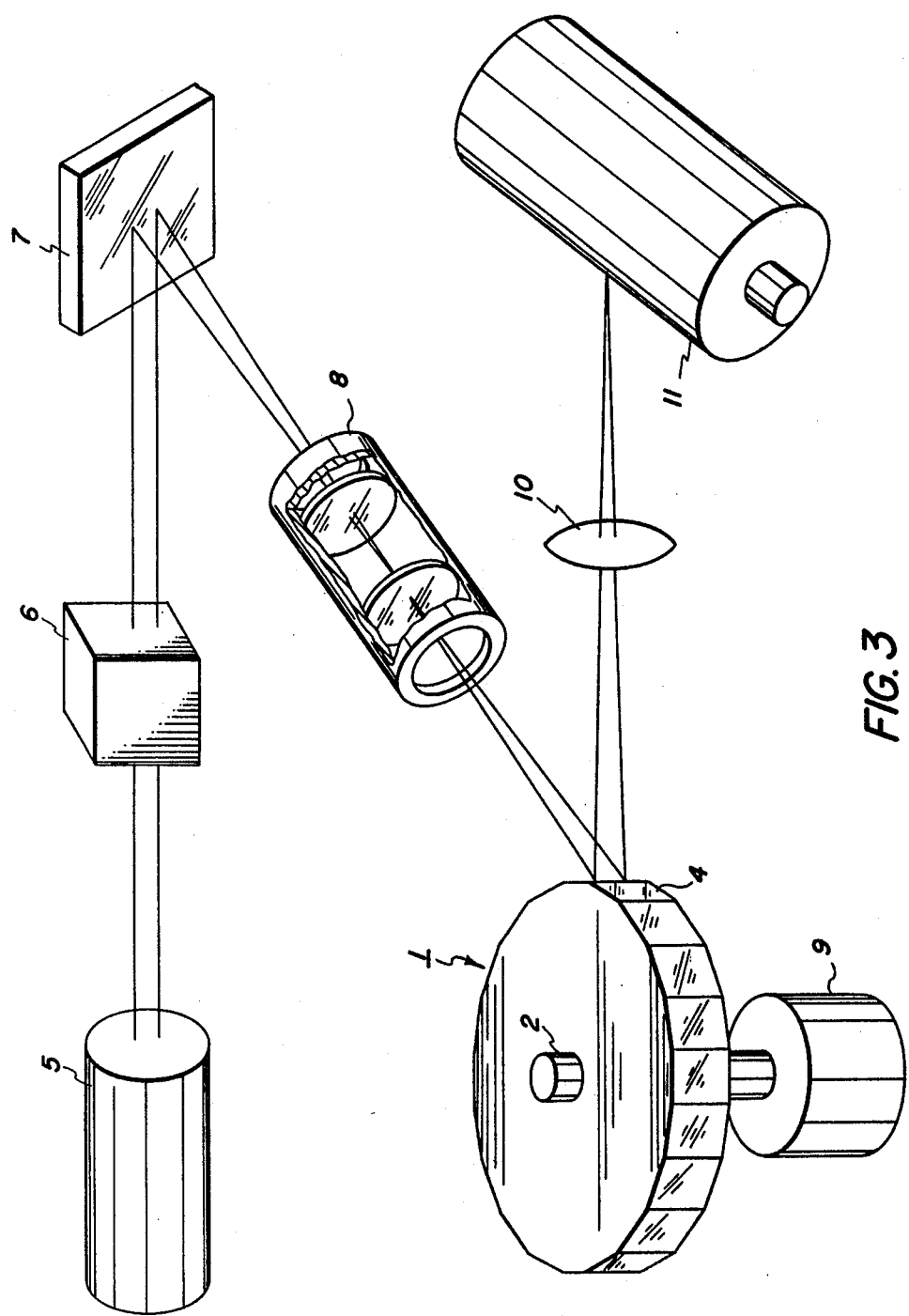
FIG. 3 is illustrated a conventional high speed scanning arrangement employing the polygonal scanner provided in FIGS. 1 and 2.

In FIG. 3 a laser 5 emits light through a modulator 6 which is reflected by a mirror 7 to a beam expander 8. The expanded beam impinges on the scanner facets 4 which are rotated at high speed by motor 9. The scanned beam then passes through a focusing lens 10 and is directed to the photoreceptor surface 11.

In the embodiments as illustrated in both FIG. 1 and FIG. 2 the acrylic is then coated with magnesium fluoride coating 32 and then aluminum 33 and then may be finished with a silicon monoxide protective coating 34 or other suitable protective coating. In each case, the magnesium fluoride is applied by any suitable technique to insure that the proper facet geometry is maintained.

Typical such techniques include: evaporation in vacuum among others. The aluminum is deposited by vacuum evaporation resulting in a mirror-like finish employing conventional techniques which preserve and maintain the appropriate and precise facet geometry. Typical techniques include evaporation in vacuum among others.

The SiO protective coating may thereafter be applied employing any suitable conventional technique which preserves the facet geometry. Typical methods include evaporation in vacuum among others.

Both the finishing coating that may be applied to the surface of the acrylic facets e.g. aluminum followed by either a protective coating of SiO or $MgF_2$ are deposited employing e.g. the technique outlined by P. Beumeister in *Applied Optics and Optical Engineering*, ACADEMIC PRESS, 1965, page 301 et sequel.

The multi-faceted high speed scanner having thus been provided may be employed in any suitable conventional high speed scanning application.

Typical applications of this system include deflection of a light beam such as laser in such a manner that it produces a "flying spot". When this bright spot is moved across an object-document having high and low density areas by rotation of the scanner, a light detector (placed in the vicinity) provides an electronic signal which is low or non-existent when the spot is in a dark area, and high when the spot is in a light area of the document. This type of scanning system is used in facsimile devices and in optical character readers. Since this system can be used (in conjunction with other hard and software) to decode alpha numerics, it is also known as a "reader". Another system which also uses multi-faceted scanners is the so-called "write" system. The overall arrangement in general is the same except that in the stationary path of the beam (before the scanner) a light switch known as a modulator is used to "write" the image on a xerographic photoreceptor. The signal going into the modulator can come either from the light detector of the "read" station, or from a character generator which is the case with computer printers.

To further define the specifics of the instant invention, the following examples are intended to illustrate and not limit the particulars of the present system. Parts and percentages are by weight unless otherwise indicated.

EXAMPLE I

An aluminum 7075-T651 preform disk having the following dimensions: 2 inches OD, ¾ inch ID, ⅜ inch thick is held in place in the mold while the molded acrylic is injected into the die cavity having the proper facet geometry. After the injection die is cooled the part is removed. The acrylic ring is firmly held on the aluminum disk by the force developed from the greater shrinkage of the acrylic deposition. A 100A° layer of magnesium fluoride is then uniformly applied over the acrylic by vacuum evaporating and then 100A° of aluminum is deposited over the magnesium fluoride adhesive coating by vapor deposition. 200A° of SiO is then vacuum deposited over the mirror-like aluminum facets to protect them. Several disks are assembled on a rod and placed in a vacuum chamber, along with $MgF_2$ aluminum and SiO. The chamber is pumped down to the required vacuum and the $MgF_2$, aluminum and SiO are evaporated in that order by heating them above their melting temperatures. The parts are rotated during evaporation.

EXAMPLE II

An acrylic ring is molded to the precise geometry as follows: ring geometry: 2.860 inches diameter across facets, 2.312 inches inside diameter and 0.375 inch thick. The acrylic ring is produced by injection molding in a die cavity having the required geometry and precision employing conventional techniques.

This ring is then cemented onto a preformed disk employing ultraviolet sensitive cement such as UV-71 by Summers Laboratories, Inc. The thickness of the cement between the acrylic ring and the aluminum disk is approximately 0.006 inch thick. The cement is applied on the aluminum disk by a medical type injection needle. After the acrylic ring has been set in place and fixed by exposure to a Xenon light source which radiates in the 3600A° region, a 100A° coating of magnesium fluoride is then applied over the ring and a 100A° mirror-like finish of aluminum is deposited on the face of the magnesium fluoride coated facets which are then covered with a 200A° SiO protective coating as in Example I. The procedures here employed for the precise fabrication of the aluminum disk, the method of application and injection molding of the acrylic ring to the proper facet geometry, the method of coating the magnesium fluoride on the facets of the acrylic ring, the method of application of the aluminum on the adhesively coated acrylic ring, and the method of overcoating with SiO are substantially the same as in Example I.

Although the present examples were specific in terms of conditions and materials used, any of the above listed typical material may be substituted when suitable in the above examples with similar results. In addition to the steps used to carry out the process of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

What is claimed is:

1. A process of making a high speed multifaceted polygonal scanner comprising providing a die cavity having a geometry which includes a plurality of facet shaped surfaces, placing an aluminum member into said cavity, said aluminum member being sized so as to provide a gap for a suitably dimensioned injected material having suitable mechanical and optical properties for high speed scanning applications, and injection molding acrylic into the gap between the aluminum member and the die cavity, an injected molded acrylic scanner comprising the injected molded acrylic having a plurality of facets on one surface thereof and an aluminum member thereby being formed, removing said injected molded acrylic scanner from said die cavity, coating the facets of said acrylic scanner with magnesium fluoride, and then applying a mirrorlike finish of aluminum to the surface of said magnesium fluoride coated acrylic scanner to provide a high speed multifaceted polygonal scanner, said magnesium fluoride enhancing the adherence of said aluminum finish to said acrylic scanner.

2. The process as defined in claim 1 wherein a protective coating is applied to the finished aluminum coating.

3. The process as defined in claim 2 wherein said protective coating comprises silicon monoxide.

4. The process as defined in claim 1 wherein the aluminum hub comprises an aluminum alloy 7075-T651 having the following properties:

| Nominal Chemical Composition | | |
|---|---|---|
| Zinc | 5.6% | |
| Magnesium | 2.5% | |
| Copper | 1.6% | |
| Chromium | 0.3% | |
| Aluminum | Balance (incl. normal impurities) | |
| Typical Mechanical Properties | Tensile Strength, psi | 83,000 |
| | Yield Strength, psi | 73,000 |
| | Elongation, % in 2" | 11 |
| | Shear Strength, psi | 48,000 |
| | Brinell Hardness 10/500 | 150 |
| Typical Physical Properties | Density, Lbs./Cu. In. | 0.101 |
| | Melting Range, approx. °F | 890–1180 |
| | Electrical Conductivity, % IACS at 20° C (68° F) | 33 |
| | Thermal Conductivity, btu at 25° C (77° F) | 900 |
| | Average Coefficient of Thermal Expansion at 68° to 212° F | 0.0000131 |

5. A process of making a high speed, multifaceted polygonal scanner comprising providing an aluminum member which is capable of accepting an acrylic material on its periphery, providing an injection molded acrylic material having a first surface which comprises a plurality of facets and a second surface sized so as to conform to the periphery of said aluminum member, cementing said acrylic material to the periphery of said aluminum member, coating the facets of said acrylic material with magnesium fluoride and then applying a mirrorlike finish of aluminum to the surface of said magnesium fluoride coated facets to provide the high speed multifaceted polygonal scanner, said magnesium fluoride enhancing the adherence of said aluminum finish to said acrylic material.

6. The process as defined in claim 5 wherein a protective coating is applied to the aluminum surface.

7. The process as defined in claim 6 wherein said protective coating comprises silicon monoxide.

8. The process as defined in claim 5 wherein the aluminum hub comprises an aluminum alloy designated as 7075-T651 having the following properties:

| Nominal Chemical Composition | | |
|---|---|---|
| Zinc | 5.6% | |
| Magnesium | 2.5% | |
| Copper | 1.6% | |
| Chromium | 0.3% | |
| Aluminum | Balance (incl. normal impurities) | |
| Typical Mechanical Properties | Tensile Strength, psi | 83,000 |
| | Yield Strength, psi | 73,000 |
| | Elongation, % in 2" | 11 |
| | Shear Strength, psi | 48,000 |
| | Brinell Hardness 10/500 | 150 |
| Typical Physical Properties | Density, Lbs./Cu. In. | 0.101 |
| | Melting Range, approx. °F | 890–1180 |
| | Electrical Conductivity, % IACS at 20° C (68° F) | 33 |
| | Thermal Conductivity, btu at 25° C (77° F) | 900 |
| | Average Coefficient of Thermal Expansion at 68° to 212° F | 0.0000131 |

* * * * *